Patented Mar. 18, 1952

2,589,898

UNITED STATES PATENT OFFICE 2,589,898

METHOD OF STIMULATING THE GROWTH OF MAMMARY GLANDS AND LOBULE-ALVEOLAR SYSTEM OF MAMMALS

Charles W. Turner, Columbia, Mo., assignor to American Dairies, Incorporated, Kansas City, Mo., a corporation of Maryland, and The Quaker Oats Company, Chicago, Ill., a corporation of New Jersey No Drawing. Application April 3, 1948, Serial No. 18,857

11 Claims. (Cl. 99—2)

This invention relates to improvements in stimulating the growth of mammary glands and the initiation of milk secretion in livestock by the addition to their ration of selected natural or synthetic chemicals and hormones or derivatives of the same.

In brief, the invention contemplates the following basic concepts:

1. The use of progesterone or related compounds having progesterone-like activity alone or in admixture to stimulate the growth of the lobule-alveolar system of the udder.

2. The use of progesterone or related compounds having progesterone-like activity with estrogens to stimulate the growth of the lobule-alveolar system of the udder.

3. The use of progesterone and estrogen with protamone to stimulate the growth of the milk secreting system of the udder.

4. The use of progesterone and estrogen with androgen to stimulate the same type of growth.

5. The use of progesterone, estrogen, androgen and protamone to produce maximum lobule-alveolar growth.

These compounds may be used on normal non-pregnant animals, sterile females and some males as well as pregnant animals with poor genetic udder size potential.

A modification of the invention resides in the concept of inducing the state of lactation after the above growth stage has been fully developed. This is accomplished as follows:

1. By discontinuing the administration of progesterone or compounds having progesterone-like activity.

2. Increasing the amount of estrogen or estrogen-like compounds which will initiate lactation and regular milking will be inaugurated, then stop or at least reduce the amount of estrogen.

3. A procedure as in paragraph 2 above, with the addition of a protamone to the estrogen to bring in full lactation.

4. A procedure as in paragraph 2 above wherein a male hormone is added as a supplemental factor.

5. The administration of estrogen, androgen and protamone to initiate lactation, then reducing the estrogen and androgen while increasing the protamone to full lactation according to the body weight.

In other words the invention resides primarily in incorporating into the ration of mammals one or a series of hormone or hormone-like compounds which have been found to synergize with each other to the end that maximum and complete mammary gland growth is effected and lactation is stimulated or improved. The amounts of the hormone prescribed, as well as the ratio of one to the other, are critical if maximum growth is to be attained. The uniform oral administration of the hormones and hormone-like compounds as an integral part of the ration furnishes uniform amounts of the hormones in the blood and tissues comparable to the endogenous supply of the essential factors. In addition to the administration of the hormones and other substances suggested, the success of the invention depends as well upon the proper timing or sequence of administration of these substances or compositions.

In its broader aspects the invention contemplates the improvement in milk producing capacity of normal animals whose mammary gland growth during pregancy is deficient in the natural endogenous hormones which normally stimulate the growth of these glands. It further contemplates the stimulation and growth of mammary glands of sterile animals or those incapable of a normal pregnancy during which time complete growth of the mammary gland normally occurs.

In animals which abort or lose the products of conception before the end of the normal period of pregnancy, this invention provides a method of improving the growth and capacity of the udder and its milk producing system. By the use of the substances suggested and hereinafter described in more detail, the tendency of such animals to abort may be prevented or delayed.

This invention is an improvement upon an application Serial No. 587,444, filed April 9, 1945, issued February 13, 1951, as Patent No. 2,541,447, and a continuation-in-part of an application Serial No. 686,954, filed July 29, 1946, now abandoned.

It is also contemplated that with the hormones and other compounds suggested there may be admixed salt, mineral mixtures of calcium, phosphorous, anad trace elements such as feeding oils of various types or other supplements. Where these additional materials are added the total supplement either separately or mixed with the feed concentrate should be such as to provide the administration of the hormones and chemicals within the range of daily intake specified in examples hereinafter provided, as well as according to the teaching with respect to the proper time sequence for administering the different substances or compositions.

GROWTH OF THE MAMMARY GLAND AND MILK SECRETION

It is well known to the art that in normal animals the growth of the mammary glands (the milk secreting glands) occurs in two stages:

(a) When animals become sexually mature, certain endogenous hormones gradually stimulate the growth of the duct system which is in general appearance, comparable to the naked branches of a tree. Glands at this stage are capable of being stimulated so as to produce a slight milk secretion.

(b) When a mammal conceives, the endogenous hormones secreted during pregnancy stimulate further extension of the duct system and in addition the growth of enlarged end buds called the lobule-alveolar system. This latter type of growth of the gland vastly increases the number of epithelial cells which secrete milk and thus greatly increases the capacity of the mammary glands to secrete milk.

Shortly before normal parturition the growth phase of the mammary gland now being complete, the endogenous hormones appear to selectively act upon and stimulate the epithelial cells to gradually increase milk secretion which is further greatly increased after parturition. Unfortunately, there are great differences in the amount of endogenous hormones which stimulate the growth and milk secretions of the mammary glands in various strains, breeds and classes of animals. In some stock the mammary glands (udder) are very small in size and never attain optimum functional condition, whereas in other animals the extent of growth of secreting tissue is very great. Due in part to the variation in the amount of gland tissue, there is a variation in the yield of milk.

This invention has to do with the method of increasing the extent of growth of the mammary glands by supplementing the normal endogenous hormones of animals whose glands are deficient in this respect. Many dairy animals each year fail to conceive. In others when the lactation process stops (go dry) they become worthless as dairy animals due to our past inability to reinitiate growth of the mammary gland comparable to that occurring during pregnancy and lactation comparable to that observed after parturition. By the use of the substances suggested and utilizing such substances according to the teachings hereinafter set forth, such animals may be again brought into intense milk secretion.

PROGESTERONE AND RELATED COMPOUNDS

A considerable number of chemical compounds have been discovered which have the property of producing progestational proliferation of the rabbit uterus. Progesterone has been used as a standard in the biological assays of these chemical compounds; 1 mg. of progesterone equals one international unit. A number of other related compounds have progesterone-like activity, including pregneninolone, desoxycorticosterone, dehydroandrosterone, acetoxy-pregneninolene and the like. These compounds and others possess varying degrees of progesterone-like activity and may be substituted for progesterone in the various examples according to the amount of oral progesterone-like activity which they possess.

NATURAL AND SYNTHETIC ESTROGENIC OR FEMALE SEX HORMONES

Estrogenic hormones are characterized by their specific influence upon the genital tissues of the female, including growth of the vagina, stimulation of the uterus, growth and secretion of the oviduct in birds. The most potent natural estrogens include estradiol, estrone, estriol, equilin, hippulin, equilenin, and their derivatives.

The most potent estrogen-like chemical compounds include diethyl stilbestrol and its derivatives such as its esters and ethers; dihydro stilbestrol (hexestrol), as well as derivatives of the latter; benzestrol, 2-4 di(parahydro-xyphenyl 3-ethylhexane) and its derivatives. These compounds are mentioned in copending application Serial No. 587,444 and vary in oral physiological activity and differ in potency from one another. Their use will be described in physiological terms using dimethyl ether of diethyl stilbestrol as a standard. Other compounds of a similar nature vary in effectiveness, depending upon their oral potency.

NATURAL AND SYNTHETIC THYROID HORMONE OR THYROXINE

The thyroid gland secretes a hormone called thyroglobulin which contains the amino acid called thyroxine as the active physiological ingredient. The entire dried thyroid gland can be administered or the thyroglobulin can be separated and purified. In any event, thyroxine or its derivatives serve the same physiological purpose.

Thyroxine can be formed in vitro in any protein containing tyrosine by a process described in U. S. Patents 2,329,445 and 2,379,842. The material formed, according to the teachings of these patents, is, for convenience in the art, designated as a protamone and contains about 3% of thyroxine which will be used as a standard in the examples, but equal synergistic effect may be obtained by the oral administration of other thyro-active preparations in suitable proportions.

TESTOSTERONE, ANDROSTERONE, AND RELATED MALE HORMONES

Androgenic hormones are characterized by their specific influences upon the secondary sex glands of male mammals and upon the growth of the comb and head furnishings of both male and female fowls. The most potent compounds having these general properties include testosterone and its derivatives, androsterone and its derivatives and many related compounds having varying physiological effects. These hormones are normally secreted by both male and female mammals and birds and are excreted in various forms in the urine and feces.

As described in copending application Serial No. 686,954 filed July 29, 1946, the presence of large quantities of androgens has been observed in the feces of lactating dairy cattle. Dried manure from lactating cows, crude extracts of cow manure and purified and separated androgenic hormones may be substituted on an equivalent oral hormone basis in the examples.

COMPLETE GROWTH OF THE MAMMARY GLAND OF NORMAL, STERILE OR OVARIECTOMIZED MAMMALS

The growth of the female (and some male) mammary glands is stimulated to extensive duct development and some lobule-alveolar growth by feeding the regular grain mixture to which is added specified amounts of any one of the estrogens such as diethyl stilbestrol or its derivatives, as described in Serial No. 587,444. The growth of the mammary gland of a similar type and of variable extent can be stimulated by the inclusion in the feed composition of androgens as described in Serial No. 586,954.

These hormones either alone or together still fail to complete the growth of the lobule-alveolar system of the mammary gland comparable to that observed after the middle of prenancy. This important stage of the mammary gland development can be stimulated by the incorporation in the feed composition of either progesterone, pregneninolone or other natural or synthetic compounds having the property of producing progestational proliferation of the rabbit uterus. For the most efficient action of the progesterone or the other compounds specified, small amounts of the natural or synthetic estrogens should be added to the feed composition. Thus, while progesterone when fed alone in suitable amounts will stimulate complete lobule-alveolar growth, it has been discovered that about 20% as much progesterone is required when estrogen in minimal amounts is administered simultaneously and acts synergistically upon the mammary gland.

COMPOSITIONS OF MATTER AND TIME SEQUENCE OF THEIR ADMINISTRATION

To obtain the full beneficial effects of the inventive concept, two factors are involved:

(1) The feeding of the several substances or compositions of matter as an integral part of the feed mixture.

(2) The administration of the substances at definitely established intervals during which each phase of the mammary gland development and milk secretion is to be stimulated or augmented, depending upon the type of animal treated, (a) Normal,
(b) Non-pregnant,
(c) Pregnant,
(d) Sterile.

According to the invention set forth in Serial No. 587,444, feed compositions containing natural and synthetic estrogens were described having the function of stimulating the growth of the mammary gland system and varying amounts of the lobule-alveolar system. The extent of this development compares with the development of the udders of heifers and of cows which have been dried for a number of months.

It has been determined that it is possible to stimulate the growth of mammary gland development and maintain the growth of the lobule-alveolar system comparable to the extent of development which occurs in the udder during normal pregnancy, or to stimulate an increased or augmented type of growth in the glands of pregnant animals if the endogenous hormone system is deficient by the synergism of several hormones, including estrogen and progesterone.

GROWTH OF THE UDDER

The growth of the udder may be stimulated in various ways, as follows:

1. The duct system of the udder (or mammary gland) may first be stimulated to extensive duct growth by means of substances containing estrogens, such as dimethyl ether of diethyl stilbestrol or of androgens of various types and derivatives of the same in varying amounts of estrogens and androgens administered simultaneously as an integral part of the feed or ration.

2. The duct and lobule-alveolar system of the udder may be developed continuously by the administration of progesterone or progesterone-like compounds alone, or with estrogen or synthetic estrogen-like compounds simultaneously administered without first developing the duct system.

3. During normal pregnancy, the growth of the lobule-alveolar system is stimulated by endogenous hormones. The extension of the udder or mammary gland may be effected in cases of deficient endogenous hormone secretion, by oral administration of compositions of matter containing progesterone or progesterone-like compounds and estrogen or estrogen-like compounds simultaneously.

INITIATION OF MILK SECRETION AND PARTURITION

In nonpregnant animals the growth of the lobule-alveolar system of the udder (or mammary glands) now being complete as a result of a stimulation produced by the substance mentioned, the next step is to initiate the milk secretion process in the newly grown cells of the duct and lobule-alveolar system. This is effected by discontinuing administration of progesterone or progesterone-like compounds and by maintaining or increasing the amount of estrogen or estrogen-like compounds. As soon as the udder fills with milk, the milk secretion process is started and continues with the regular daily removal of milk. After about ten days the estrogen may be discontinued or at least reduced in amount and milk production will continue as it did following a normal parturition.

In normal pregnant animals the progesterone and estrogen will be orally administered as described in paragraph numbered 3 under the heading "Growth of the Udder" immediately preceding this heading. Normally, the full growth of the udder is developed between the first one-half or two-thirds period of the pregnancy. The synergistic effect of exogenous hormones administered during this period of pregnancy having increased the total growth of the gland, the mixture (feed containing estrogen and progesterone in proper proportions) may be gradually discontinued if preferred, or it may be continued until shortly before parturition. At this time, if not earlier, progesterone is discontinued and estrogen increased as indicated above. The increased estrogen will aid in the production of parturition and in causing the initiation of increased milk secretion.

TESTS WITH EXPERIMENTAL ANIMALS

The growth of the mammary gland, the initiation and maintenance of the milk secretion process has been discovered to be stimulated progressively by the oral administration of the hormones. Since it has been observed that mammals follow the same pattern of mammary gland development, the most complete description of our invention will be stated in terms of the requirements of the experimental animals. The first stage of mammary development consists of the growth of the duct system. This type of growth can be stimulated by the following procedures.

EXAMPLE I.—MICE

The duct system of either male or female mice are stimulated by incorporating into the regular complete mouse feed the dimethyl ether of diethylstilbestrol in amounts varying from 0.01 to 5.0 mg. (0.000001 to 0.0005%) per kg. of feed and fed for four weeks or more. When fed at levels of 1 mg. per kg. of feed or more, this compound will inhibit body growth but will stimulate mammary duct growth better than that obtained with less. By feeding 0.1 to 0.5 mg. per kg. of feed well developed duct systems can be produced in four to six weeks.

Other derivatives of diethylstilbestrol and related synthetic and natural estrogenic hormones may be substituted in the above complete mouse feed in amounts which will produce equal duct growth.

The synthetic estrogens depress feed consumption in proportion to the amounts present in the feed. Thus upon levels which produce the most rapid duct growth as indicated above, body weight is inhibited and other undesirable effects are produced.

The duct system of the mouse mammary gland may also be stimulated by the incorporation in the ration of methyl testosterone in amounts varying from 1.0 to 50.0 mg. per kg. (0.0001 to 0.005%) of feed and fed for four weeks or more. Physiological equivalent amounts of other androgens or crude extracts of cow manure may be substituted.

Furthermore, some of the undesirable effects of the diethylstilbestrol derivatives may be corrected by the simultaneous administration of methyl testosterone with the above synthetic estrogens. There is real synergism of the two sex hormones approaching closely the natural condition. Either the estrogens alone and their derivatives or the androgens and their derivatives or these two sex hormones combined together become more effective in stimulating duct growth when combined with protamone, the synthetic thyroprotein containing 3% equivalent of thyroxine. This synergism or augmentation of the duct growth rate is accomplished by incorporating in the complete mouse feed the amounts of estrogens or androgens separately or together prescribed above together with a range of protamone from 100 mg. to 3000 mg. per kg. of feed. The tolerance of protamone is greater with female mice than males so that the higher portion of the range indicated applies only to the females. By the feeding of the above combinations of matter it is possible in the male, or castrate, immature or sterile female to stimulate the full duct development of the mammary gland.

EXAMPLE II.—RABBITS

The duct system of the immature female rabbit or immature and mature male rabbit is stimulated to extensive growth and development by incorporating into the regular rabbit grain feed (rabbits are normally fed grain ration and hay) the estrogen, androgen or other selected natural or synthetic chemical or hormones. If the hay is ground and incorporated in the grain ration the amounts of the several ingredients would be changed accordingly, the synthetic estrogen called the dimethyl ether of diethylstilbestrol in amounts varying from 0.4 to 5.4 mg. per kg. feed. Other derivatives of diethyl stilbestrol and other synthetic or natural estrogens may be substituted in equivalent physiological amounts. Still larger amounts of the dimethyl ether can be fed for limited periods but undesirable side effects begin to appear. At the upper limits recommended, namely, 5.4 mg. per kg. feed, a feeding period of about four weeks produces good duct development. Similar duct development may be stimulated in the rabbit by the incorporation in the grain ration of methyl testosterone in amounts varying from 1.0 to 50 mg. per kg. (0.0001 to 0.005%) of feed and fed for about four weeks. These two sex hormones may be combined in the grain ration in the above described amounts with a synergism of their separate function.

Either the estrogens alone and their derivatives or the androgens and their derivatives or these two sex hormones combined together become more effective in stimulating duct growth when combined with protamone, the synthetic thyroprotein containing 3% equivalent of thyroxine. The augmentation of the duct growth is accomplished by incorporating in the grain feed the amounts of estrogens or androgens separately or together with a range of protamone from 0.02 to 0.0075% or 200 to 75 mg. per kg. grain feed. The larger amount represents the upper limits of tolerance for the period of about four weeks.

EXAMPLE III.—GOATS

The duct systems in the udders of young goats may be stimulated to growth by incorporating in the grain ration the dimethyl ether of diethylstilbestrol in amounts varying from 10 to 50 mg. per kg. feed. This grain feed should be fed at the rate of about 1 kilo feed per 100 lbs. body weight daily. Other estrogens may be substituted in equivalent physiological amounts orally administered. This feeding program may be continued in half grown kids for a period of two to three months.

Methyl testosterone in amounts varying from 10 to 50 mg. per kg. of feed may be substituted for the estrogens or the two may be combined as described for the mouse and rabbit. Estrogen and androgen alone or together may be combined within the dosage range prescribed with protamone, the synthetic thyroprotein containing 3% equivalent of thyroxine. The protamone is added to the grain ration at the rate of 0.5 to 1.75 gm. per kg. grain mixture to be fed at the rate of 1 kg. feed per 100 lbs. of body weight per day. By this combination of hormones the maximum synergism effective in rapid gland development occurs.

EXAMPLE IV.—CATTLE

In the stimulation of the duct system of heifers, the normal plan would be to wait until sexual maturity or until the animal is a year or more of age. Even if it were impossible to cause such animals to conceive, the duct system in each quarter would be partially stimulated by the recurring estrus cycles. To complete the growth of the duct system, there should be incorporated in the grain ration dimethyl ether of diethylstilbestrol in amounts ranging from 10 to 200 mg. per kg. of feed. This grain is fed at the rate of 3 kg. per 1000 lbs. body weight daily.

Methyl testosterone in amounts varying from 10 to 100 mg. per kg. of feed may be substituted for the estrogen or preferably the estrogen prescribed above may be combined with androgen and the combination of matter fed at the rate of 3 kg. per 1000 lbs. body weight daily. To promote maximum rapidity of gland growth, the estrogen or androgen separately or together are combined with protamone, the synthetic thyroprotein containing 3% equivalent of thyroxine. The protamone is added to the above described hormones and to the grain ration at the rate of 1.0 gm. to 6.0 gm. per kg. of feed to be fed at the rate of 3 kg. per 1000 lbs. body weight daily.

Lobule-alveolar growth

The duct system of the mammary glands or udders can be developed by the composition of matter described in the previous examples. This development must take place before the lobule-alveolar system can be grown. The hormone combinations previously described stimulate mammary gland development efficiently but will not carry the mammary gland development much beyond this initial stage. The compositions of matter to be described will also stimulate duct development when it is not present but will, in addition, carry the mammary gland (udder) development and growth to the point comparable to that at the ⅔ period of pregnancy. The same treatment can be administered to pregnant animals to cause mammary gland growth in excess of their own capacity to produce if their inheritance for gland or udder size is limited.

EXAMPLE V.—MICE

The lobule-alveolar system of the mouse mammary gland is stimulated to grow from the duct system by the continued feeding of the dimethylether of diethylstilbesterol indicated above plus 0.1 to 1.0 gm. of progesterone per kg. of feed. Amounts of progesterone slightly above the 1.0 gm. level may be safely fed with good results but the degree of lobule-alveolar development will not be greatly improved. An excess of progesterone is known to possess anesthetic properties.

Thus a typical mouse ration to stimulate lobule-alveolar development would consist of the following composition:

Dimethyl ether of diethylstilbesterol
mg. per kg__ 0.05-1.5
Progesterone _____gm. per kg__ 0.1-1.0

Maximum synergism of the diethylstilbestrol is obtained when not over the upper limits of the compound indicated above are fed, i. e., 1.0 mg. per kg. of feed. If the dimethylstilbestrol is entirely eliminated from the ration, progesterone alone will stimulate the lobule-alveolar system but the requirements are increased from 5 to 10 times. In addition to progesterone, pregneninolone and desoxycorticosterone can be substituted in equal amounts and other related compounds and derivatives in equal physiological amounts.

The rate and completeness of lobule-alveolar growth can be stimulated by adding to the above ration, protamone, the synthetic thyroprotein containing 3% equivalent of thyroxine, in amounts ranging from 100 mg. to 3000 mg. per kg. of the above composition of matter.

EXAMPLE VI.—RABBITS

Growth of the lobule-alveolar system is stimulated to a degree comparable to pseudo-pregnancy or 20 days of pregnancy by the continued feeding of the above amounts of dimethyl ether of diethylstilbestrol (0.4 to 5.4 mg. per kg. of feed) plus (10 mg. to 300 mg. of progesterone per kg. of feed). The growth on the lower levels of progesterone specified will be very slow whereas the higher levels will promote faster growth but less efficient use of the hormone. Amounts of progesterone above the level specified are effective but may induce degrees of anesthesia which would be highly undesirable. In place of progesterone, pregneninolone, and desoxycorticosterone and other related compounds and derivatives of the above may be substituted on an equal physiological basis.

The rate and completeness of lobule-alveolar growth can be augmented by the addition to the ration of protamone the synthetic thyroprotein containing 3% equivalent of thyroxine, in amounts ranging from 75 mg. to 200 mg. per kg. of grain mixture.

EXAMPLE VII.—GOATS

Growth of the lobule-alveolar system of the goat's udder to a degree comparable to that of ⅔ of pregnancy is stimulated by incorporating in the grain ration the following ingredients:

Dimethyl ether of diethylstilbestrol at a rate of 5 mg. to 10 mg. per kg. of feed.

Progesterone at the rate of 10 mg. to 500 mg. per kg.

The grain ration is fed at the rate of about 1 kg. per 100 lbs. body weight of the goats per day. In place of progesterone, pregneninolone, desoxycorticosterone and other related compounds and derivatives may be substituted on an equal physiological basis. Excessive amounts of these compounds likewise have a tendency to induce varying degrees of anesthesia.

The rate and completeness of lobule-alveolar growth can be augmented by the addition to the above composition of matter, protamone, the synthetic thyroprotein containing 3% of thyroxine, in amounts ranging from 0.5 to 1.75 gm. per kg. grain mixture to be fed in the amounts prescribed above.

EXAMPLE VIII.—CATTLE

Growth of the lobule-alveolar system of the cows' udder to a degree comparable to that of ⅔ pregnancy can be stimulated by incorporating in the grain ration the following ingredients:

Dimethyl ether of diethylstilbestrol at the rate of 10 mg. to 200 mg. per kg. of feed.

Progesterone at the rate of 10 mg. to 200 mg. per kg. of feed.

This composition of matter is to be fed at the rate of 3 kg. per 1000 lbs. body weight daily. In place of progesterone, pregneninolone, desoxycorticosterone and other related compounds and derivatives may be substituted on an equal physiological basis. The upper amounts of progesterone prescribed may be exceeded but the ratio of estrogen to progesterone reaches a point of maximum synergism with less rapid growth occurring on either side. The anesthetic effect of high dosages of these compounds must be avoided.

To promote more rapid growth at the point of maximum synergism of estrogen and progesterone it is necessary to add a third hormone, synthetic thyroprotin or its equivalent containing 3% of thyroxine. Protamone or equivalent is added to the above described hormones and to the grain ration at the rate of 1.0 gm. to 5.0 gm. per kg. of feed and fed at the rate of 3 kg. per 1000 lbs. body weight daily. The feed consumption is also favorably influenced by protamone.

The time required to cause the complete development of the lobule-alveolar system will vary with the amount and synergism of the several hormones prescribed. Since this development during pregnancy requires about 6 months in cattle, a period of similar length or longer would be expected to produce comparable growth by artificial means. However, before complete growth is attained cows can be brought into lactation varying in amount with the extent of growth of the lobule-alveolar system present at the time.

Initiation of milk secretion

When the mammary glands and udder lobule-alveolar systems are completely developed or in fact when they have developed to any extent beyond the rudimentary duct system, the epithelial cells may be stimulated to the secretion of milk by treatment of a composition of matter to be described.

If the previous compositions have been fed to pregnant animals, the change to be described will usually occur shortly before the normal period of parturition.

EXAMPLE IX.—MICE

When complete lobule-alveolar mammary gland growth has been induced by the above described treatment for periods of not less than two to three weeks (indefinitely longer treatment may be practiced), lactation can then be induced by the removal of the progesterone or related compounds from the ration but by the continuation of the dimethyl ether of diethylstilbestrol for a period of two days to a week, then all estrogens are removed from the ration and lactation will occur spontaneously. Baby mice placed with such lactating mice will obtain milk sufficient to grow normally.

EXAMPLE X.—RABBITS

Following full lobule-alveolar growth of the mammary glands, lactation is produced by eliminating the progesterone but continuing the dimethylether of diethylstilbestrol in the ration at the level indicated above (0.4 to 5.4 mg. per kg. of feed) for a period not exceeding a week, then all hormone treatment is discontinued and milk secretion quickly fills the mammary glands.

EXAMPLE XI.—GOATS

Milk secretion is initiated in the goat by feeding a grain ratio containing the dimethyl ether of diethylstilbestrol or other estrogens in equivalent amounts varying from 10 to 50 mg. per kg. of feed with protamone at the rate of 0.5 to 1.75 gm. per kg. of grain mixture fed at the rate of 1 kg. feed per 100 lbs. body weight per day for a period not to exceed one week. At that time the dimethyl ether of diethylstilbestrol is removed from the feed but the protamone feeding is continued.

When maximum daily milk secretion is reached, milk production is then maintained by continuing the protamone together with ¼ the amount of the estrogen in the ration during the first week. By means of the synergism of these two hormones, the secretion of milk is maintained at a high level for long periods.

Further maintenance of milk production is attained by the incorporation of 5 mg. to 40 mg. of methyl testosterone per kg. of feed fed with the above ration.

EXAMPLE XII.—CATTLE

In sterile cows whose mammary glands have been developed by the methods previously described or in pregnant cows in which the normal growth of the udder has been augmented by the feeding of these compositions, the secretion of milk and the parturition of pregnant cows, followed by lactation, is initiated by removal of the progesterone from the composition used to stimulate the growth of the lobule-alveolar system. The composition fed would then be composed as follows:

Dimethyl ether of diethylstilbestrol (or equivalent) at the rate of 10 mg. to 200 mg. per kg. of feed and fed at the rate of 3 kg. per 1000 lbs. body weight daily.

In pregnant cows this composition is fed until after parturition. Sterile cows would be fed for a week or 10 days while regular milking would be started. When milk production reaches a peak, the maintenance of this level of milk secretion is aided by the following administrations:

Dimethyl ether of diethylstilbestrol, 2.5 mg. to 50.0 mg. per kg. of feed
Protamone (or equivalent), 1.0 gm. to 5.0 gm. per kg. of feed
Methyl testosterone (or equivalent), 5.0 mg. to 50 mg. per kg. of feed These to be fed at the rate of 3 kg. per 1000 lbs. body weight daily so long as profitable milk production is maintained. In sterile cows, the growth of the lobule-alveolar system can then be re-initiated by the administration of the composition previously described which includes progesterone.

In lactating cows an alternative method of stimulating the growth of the lobule-alveolar system of the udder could be to substitute the composition described under lobule-alveolar growth for periods of one month or more to rejuvenate the gland, then return to the lactation stimulating ration.

As pointed out hereinbefore, there may be used in lieu of progesterone any of the various compounds having the property of producing progestational proliferation of the rabbit uterus, and in the appended claims the phrase "compound having progestational producing activity" is meant to embrace all such compounds, but no others.

Having thus described my invention, I claim:

1. A method for stimulating the complete growth of the mammary glands in milk secreting animals, comprising the steps of adding to their normal feed ration during pregnancy and prior to parturition, a mixture of synergistic compounds including estrogens and progesterone.

2. A method as in claim 1 including the step of discontinuing feeding of the progesterone when development of the mammary glands is complete and increasing the amount of estrogen until milk secretion proceeds normally.

3. A method as in claim 1 wherein pregneninolone is substituted for the progesterone.

4. A method for stimulating the complete growth of the mammary glands and in milk secreting animals, comprising the step of adding to their normal food ration during pregnancy and prior to parturition, synergistic compounds including an estrogen and a compound having progestational producing activity.

5. A method for favorably affecting the physiological processes of mammals, comprising the steps of adding to their normal feed ration a combination of synergistic compounds including an estrogen and a compound having progestational producing activity thereby to stimulate the complete growth of the mammary gland, discontinuing the compound having progestational producing activity when mammary gland growth is complete, and thereafter adding an estrogen to their normal feed ration thereby to initiate secretion of milk.

6. A method for favorably affecting the physiological processes of lactating animals comprising the steps of adding to their normal feed ration a combination of synergistic compounds including an estrogen and a compound having progestational producing activity thereby to stimulate the complete growth of the mammary gland, discontinuing the compound having progestational producing activity when the growth of the mammary gland is complete, and thereafter adding to the normal feed ration a combination of synergistic compounds comprising an estrogen and an androgen.

7. A method for favorably affecting the physiological processes of lactating animals comprising the steps of adding to the normal feed ration a combination of synergistic compounds including an estrogen and a compound having progestational producing activity thereby to stimulate the complete growth of the mammary gland, discontinuing the compound having progestational producing activity when the growth of the mammary gland is complete, and thereafter adding to the normal feed ration a combination of synergistic compounds comprising an estrogen and an androgen, and a thyroxine containing material.

8. A method for favorably affecting the physiological processes of pregnant lactating animals comprising the steps of adding to their normal feed ration a combination of synergistic compounds including an estrogen and a compound having progestational producing activity thereby to stimulate the complete growth of the mammary glands, discontinuing the compound having progestational producing activity prior to parturition and thereafter adding an estrogen to the normal feed ration.

9. A method for favorably affecting the physiological processes of pregnant lactating animals comprising the steps of adding to their normal feed ration a combination of synergistic compounds including an estrogen and a compound having progestational producing activity thereby to stimulate the complete growth of the mammary glands, discontinuing the compound having progestational producing activity prior to parturition and thereafter adding to the normal feed ration a combination of synergistic compounds including an estrogen and an androgen.

10. A method for favorably affecting the physiological processes of pregnant lactating animals comprising the steps of adding to their normal feed ration a combination of synergistic compounds including an estrogen and a compound having progestational producing activity thereby to stimulate the complete growth of the mammary glands, discontinuing the compound having progestational producing activity prior to parturition and thereafter adding to the normal feed ration a combination of synergistic compounds including an estrogen, an androgen and a thyroxine-containing compound.

11. A method for artificially stimulating the complete cycle of mammary gland development and lactation of mammals as observed during recurring estrous cycles, comprising the consecutive steps of first adding to their normal feed ration a combination of synergistic compounds including an estrogen and an androgen thereby to develop the mammary duct system, then adding to their normal feed ration a compound having progestational producing activity until growth of the mammary glands is complete, and then discontinuing the addition of the last mentioned compound and adding to the normal feed ration a thyroxine-containing material to augment the milk secretion.

CHARLES W. TURNER.

REFERENCES CITED

The following references are of record in the file of this patent:

Chem. Ab., vol. 36, 1942, page 3832$^5$.
Chem. Ab., vol. 41, 1947, page 3854$^1$.
Chem. Ab., vol. 38, page 1014$^8$.
Chem. Ab., vol. 38, page 407$^7$.
Chem. Ab., vol. 40, page 6601$^3$.
Chem. Ab., vol. 33, page 8759$^6$.
Chem. Ab., vol. 31, page 6303$^9$.
Chem. Ab., vol. 40, 1946, page 1573$^6$.
Chem. Ab., vol. 40, 1946, page 4126$^3$.
Chem. Ab., vol. 38, 1944, page 5278$^5$.
Chem. Ab., vol. 37, 1943, page 3491$^7$.
Annual Review of Biochemistry, vol. XIV, 1945, pages 578 and 579.
"Artificial Induction of Lactation in Bovines," by Folley et al., pages 24 to 36, Journal of Endocrinology, vol. 4, 1944.